W. LEWIS.
Corn Husker.
No. 16,737.
Patented March 3, 1857.
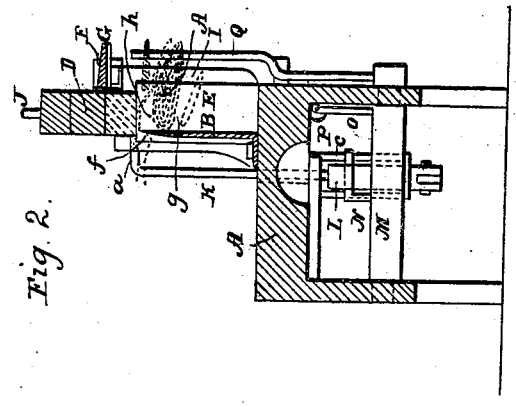
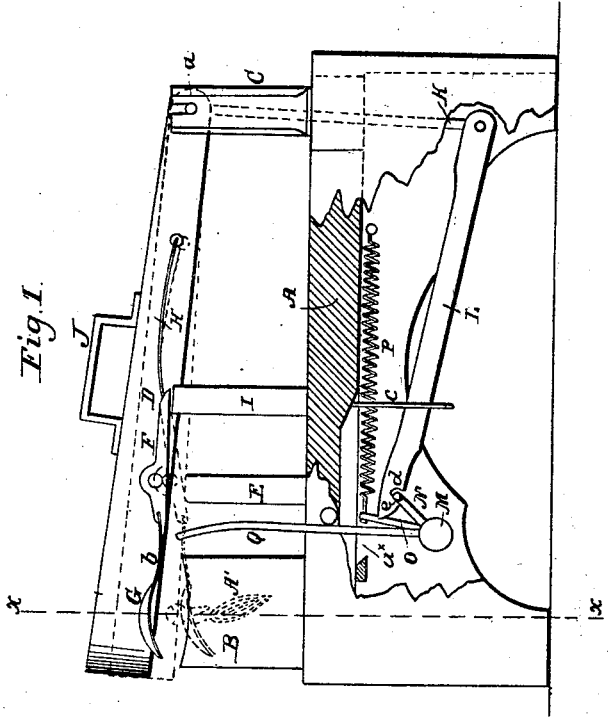

UNITED STATES PATENT OFFICE.

WILLIAM LEWIS, OF SENECA FALLS, NEW YORK.

MACHINE FOR HUSKING CORN.

Specification of Letters Patent No. 16,737, dated March 3, 1857.

*To all whom it may concern:*

Be it known that I, WILLIAM LEWIS, of Seneca Falls, in the county of Seneca and State of New York, have invented a new and Improved Machine for Husking Corn; and I do hereby declare that the following is a full, clear, and exact description of the same, reference being had to the annexed drawings, making a part of this specification, in which—

Figure 1, is a side view of my improvement; a portion of the framing or table, which supports the working parts, being broken away or removed in order to show said parts. Fig. 2 is a transverse vertical section of the same; (*x*) (*x*) in Fig. 1, showing the plane of section.

Similar letters of reference indicate corresponding parts in each of the two figures.

My invention consists in the employment or use of a bar, knife, hammer, and stop, in combination with a clearing rod; the whole being arranged and operating as will be hereinafter described.

To enable those skilled in the art to make and use my invention, I will proceed to describe its construction and operation.

A, represents a table or platform, on the front end of which a knife B is secured. This knife is formed of a steel plate, placed vertically on the table or platform, and having its upper edge made concave, and brought to a cutting edge.

On the back part of the table or platform A, a vertical bar C, is secured. The upper end of this bar is slotted vertically for a short distance, and one end of a bar D is fitted therein; the end of the bar having a fulcrum pin (*a*) passing through it; the ends of the pin (*a*) fitting in slots in the bar C. The bar D is nearly equal in length to the table or platform A; its front end extending a trifle beyond the knife B; the front end of said bar being over the cutting edge of the knife, as shown in Fig. 2.

On the table or platform A, a vertical bar E is secured. This bar serves as a stop, and is placed directly underneath the bar D; the bar or stop E preventing the bar D from coming in contact with the cutting edge of the knife.

To one side of the bar D, a rod F is pivoted, and to the outer end of this rod a hammer G is attached by an elastic plate (*b*). The hammer G may be formed of a curved plate; having its concave surface at its under side, as shown clearly in Fig. 1. The inner end of the rod F, has a spring H, bearing upon it; said spring being attached to the bar D.

I, represents a vertical bar which is attached to the table or platform A. The inner end of the rod F strikes against this bar, just before the bar strikes the bar or stop E.

J is a handle, attached to the upper surface of the bar D.

One end of the fulcrum pin (*a*) extends out beyond the bar C, and a bar K is attached to it; said bar K extending downward, and having a bar L attached to its lower end. The bar L works through a guide (*c*) attached to the under side of the table or platform A; and the front end of the bar L has a notch (*d*) made in its under side, as clearly shown in Fig. 1.

M, represents a shaft which is placed underneath the table or platform A, and near its front end. This shaft has an arm N attached to it at about its center; the outer part (*e*) of the arm being bent at a right angle with the other portion and parallel with the shaft M. The outer part (*e*) of the arm N fits in the notch (*d*) in the bar L, when the bar D is down upon the bar or stop E, its lowest position, and the part (*e*) fits or remains in said notch (*d*) till the bar D is drawn up to its highest point or position. To the shaft M, an arm O is attached and the outer end of this arm is connected to one end of a spiral spring P; the opposite end of this spring being attached to the under side of the table or platform. To one end of the shaft M a vertical rod Q is attached.

The operation is as follows: The ears of corn, shown in red, and designated by A′, are plucked from the stalks, and are placed one at a time on the cutting edge of the knife: The nubbin or butt (*f*) of the ear, where it joins the cob being placed directly on the cutting edge of the knife. The bar D, being previously drawn up by hand, is, when the nubbin or butt (*f*) is adjusted upon the knife—forced down by the hand till the bar D strikes the bar or stop E, and the nubbin or butt is severed from the ear or cob, and the husks (*g*), at the under side of the ear, are also severed from the nubbin or butt; because the bar D is prevented from coming quite in contact with the knife, by the bar or stop E; see Fig. 2. When the bar D strikes the bar or stop E, the hammer G by its momentum or inertia is forced down below the edge of the knife B, and the hammer strikes the ear of corn, detaching it from the husks.

It will be understood that the husks of the ears of corn or maize are not rigidly attached to the corn, but merely encompass it. The husks are attached to the nubbin or butt (*f*), and consequently when the nubbins or butts are cut from the ears, the ears will be readily separated or detached from the husks by the action of the hammer G. The object in not severing or cutting off the upper husks (*h*) is that said husks may retain or hold the ear till it is struck and detached from the husks by the hammer. If the upper husks were cut off at the nubbins or butts, the ears would fall to the ground with the husks attached to them.

When the bar D is drawn up for the following stroke or to operate on the succeeding ear, the bar Q is thrown forward by the movement of the bar L, which rotates or turns the shaft M. The upper end of the bar Q, as it moves forward, shoves the nubbin or butt and the husk off the knife, should they adhere or stick to it, and they most generally will. The bar Q is thrown forward till the notch (*d*) is thrown off the end (*e*) of the arm N by a leveled or inclined block (*a x*); and then the bar Q is brought back to its original position by the spring P.

This machine has been tested practically, and operates well. It may be cheaply constructed; there are no parts liable to get out of repair; and the machine be rendered inoperative, in consequence of becoming choked or clogged, as is the case with the generality of machines constructed for this purpose.

I would remark that the connection of the hammer G, to the rod F by the plate or spring (*b*) is not strictly essential. In practice, or in an operating machine, the hammer may be rigidly attached to the rod F, but probably the elastic or spring connection is preferable. I do not confine myself, however, to either mode of attachment.

Having thus described my invention, what I claim as new, and desire to secure by Letters Patent, is:

The bar D, knife B, bar or hammer G, and stop E, in combination with the clearing rod Q, when the whole are arranged to operate conjointly, as shown, for the purpose specified.

WILLIAM LEWIS

Witnesses:
 SELIM FRANCIS COHEN,
 GEORGE C. KING.